(No Model.)
J. T. HAWKINS.
AUTOMATIC TEMPERATURE REGULATOR.
No. 378,248. Patented Feb. 21, 1888.
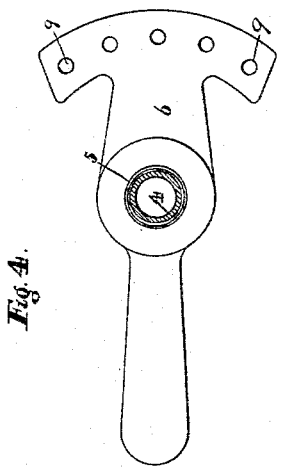
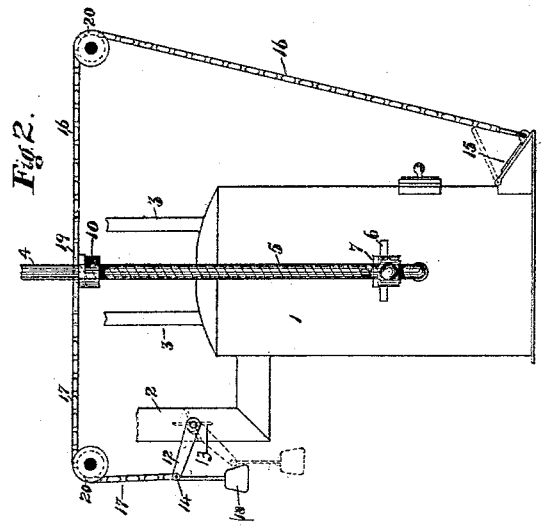
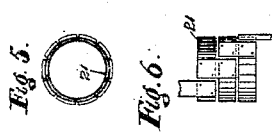
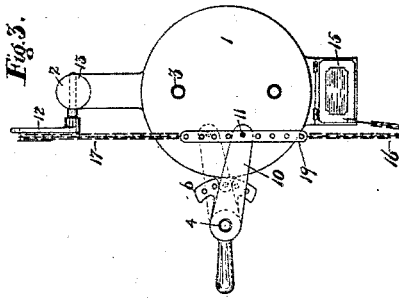
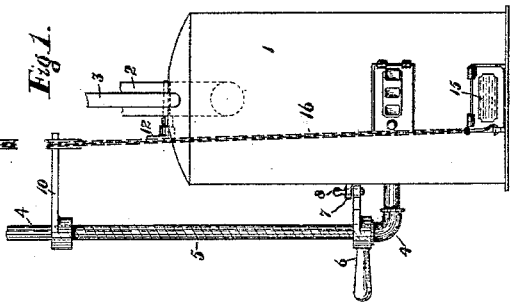
Witnesses:
Francis P. Reilly
John Tully
Inventor:
John T. Hawkins
by P. M. Voorhees
Atty.

UNITED STATES PATENT OFFICE.

JOHN T. HAWKINS, OF TAUNTON, MASSACHUSETTS.

AUTOMATIC TEMPERATURE-REGULATOR.

SPECIFICATION forming part of Letters Patent No. 378,248, dated February 21, 1888.

Application filed September 10, 1887. Serial No. 249,373. (No model.)

*To all whom it may concern:*

Be it known that I, JOHN T. HAWKINS, of Taunton, in the county of Bristol and State of Massachusetts, have invented a new and useful automatic damper-regulator for hot-water heating apparatus and other heat-generating apparatus whose temperatures are desired to be maintained at some predetermined thermal degree, of which the following is a specification.

The object of this invention is to provide automatic means of governing the combustion in the furnace of a hot-water heating apparatus through and by means of changes of temperature in the water ascending from or returning to the boiler, or to automatically regulate valves or dampers by fluctuations of its temperature in any apparatus which can be governed by such changes.

In steam-heating apparatus the desired regulation of temperature is effected in a well-known way by means of variations in the pressure of the steam acting upon a diaphragm controlling a damper or dampers; but in the hot-water method of heating no such variations of pressure occur in the pipes or boiler, while it is quite as desirable that such an apparatus should be automatically governed.

The invention will first be described in detail, and then fully set forth in the claims.

In the accompanying drawings the governing apparatus or regulator is shown as preferably attached to and acted upon by the changes in temperature of the pipe which returns the partly-cooled water to the boiler; but the regulator may be attached to the ascending or delivery pipes, if desired. A long double strip formed of two metals of diverse expansibility, as iron and brass, is wound helically about a water-return pipe, with the most expansive metal (the brass) next the pipe, as hereinafter more fully described.

In said drawings, Figure 1 is a front elevation, Fig. 2 a side elevation, and Fig. 3 a view in plan, of a hot-water boiler with the regulator attached to the return-pipe. Fig. 4 is a plan of the lever for regulating the temperature at which the water in the radiators above may be kept or the temperature at which the rooms may be maintained. Figs. 5 and 6 are two views designed to show the method in which annular split rings composed of the diversely-expansible metals may be joined in alternation at each side of their splits or openings by short straps, the action of said rings being equivalent to that of the helices shown in the other figures.

In said figures the several parts are indicated by numbers as follows: 1, the boiler; 2, the smoke-flue leading to chimney; 3, the ascending or delivery water-pipes leading to the radiators; 4, the return-pipe.

5 indicates a double helical strip of metals of unequal expansibility secured at the bottom to a lever, 6, and 7 indicates a lug attached to the boiler. A hole in lug 7 receives a pin, 8, which engages a series of holes, 9, in the lever 6, by means of which pin and holes the position of the lower end of the expansion-helix may be varied.

Secured to the upper end of the expansion-helix 5 is a lever, 10, carrying a pin, 11, in its free end. A lever, 12, is attached to a damper, 13, in the smoke-flue 2, also carrying a pin, 14, in its free end. A hinged damper, 15, leads to the ash-pit or beneath the grates, to which is connected at one end a chain, 16. A similar chain, 17, is connected to the lever 12 of the flue-damper 13, and to the same lever is hung a counterbalancing-weight, 18. The other ends of the chains 16 and 17 are connected to a perforated link, 19, by means of which the relations of the chains 16 and 17 with the lever 10 may be varied. The chains 16 and 17 run over leading-pulleys 20, which are secured in position to the flooring or walls in any suitable manner, or to the boiler, if desired.

The operation of the invention is as follows: The expansion-helix 5, being composed of two thicknesses of metal of different expansibility, with the more expansible metal on the inside in contact with the pipe and the outside metal subjected to the cooler external atmosphere, will tend to straighten or unwind upon the increase of temperature in the pipe, and, being held fast in position at the bottom end, said helix will cause the lever 10, secured to its upper end, to describe some arc of a circle for a given rise in temperature of the pipe, and thus close the dampers 13 and 15, a reduction in temperature in the pipe causing the reverse operation. Thus, if the rooms to be heated are at too low a temperature and the fire requires to be kept burning freely, the returning water will descend to pipe 4 at a minimum temperature and the dampers will remain open so long as this low temperature of the return-water continues. If the rooms become too hot, the radiators will not part with so much heat, and their returning water, through pipe 4, will be hotter and cause the dampers to close. By adjusting the lever 6 by means of the pin 8 the temperature at which the dampers will be entirely closed may be varied to suit the season and the weather; or the radiators may be automatically maintained at any desired maximum temperature, and thus the temperature of the rooms themselves regulated to correspond with the season. If attached to an ascending or delivery pipe, the expansion-helix may be adjusted to close the dampers at the boiling-point of water or at any lower temperature for the water desired as a maximum. Then, for any lowering of this temperature from the maximum, the dampers will be opened in proportion as the temperature is lowered. Thus, if the water does not enter the radiators above at the temperature for which the apparatus has been set by the lever 6 and pin 8, the dampers will be kept open until it does, and when this temperature is reached or exceeded they will be closed.

It will be understood that, the double strip of metal 5 being made up of two strips secured together, each having different coefficients of expansion, the one having the higher coefficient, being on the inside and being in the form of a helix, will tend to unwind sufficiently to give considerable motion to the lever 10 for a small change of temperature in the pipe 4, particularly as the least expansible metal forming the exterior of the helix is in contact with or exposed to the atmosphere, and will therefore never become quite so hot as the interior metal at any point where the temperature of the pipe which it surrounds exceeds that of the atmosphere. The metals preferably used for this differentially-expansible device are iron or steel for exposure to atmospheric temperature and brass or zinc for exposure to the fluctuations in temperature of the apparatus to which the device is applied. The differences in the coefficients of expansion of iron and brass being nearly as great as between those of iron and zinc, the former metal or composition in practice may be employed instead of zinc in ordinary cases. The two metals may be secured together by rivets or by solder, or in any other suitable manner.

I do not confine myself to the specific arrangement of parts herein shown, so far as the arrangement of dampers and chains and means of conveying the expansive action of the helix to the dampers are concerned, as these may be varied indefinitely as most suitable to various forms of hot-water boilers or other apparatus and their surroundings and attachments. Nor do I confine myself to the use of the helix form for regulating combustion in hot-water heating or other heating apparatus, as it may be adapted to various other purposes where a similar large movement of a lever, as 10, for a small variation in temperature may be desired.

An equivalent for the expansion-helix 5 may be employed, if preferred, made up of a series of open rings, 21, of differentially-expansible metals, connected at their open ends by short straps 22, as shown in Fig. 5 in plan and in Fig. 6 in elevation. Such construction, it is obvious, operates upon the same principle and will effect the same result as the helix 5, above described.

I do not herein broadly claim a sensitive helical coil composed of two metals of diverse expansibility; but,

Having thus fully described my said invention, I claim—

1. In a heat-generating apparatus, in combination with and connected to a damper or dampers for regulating the combustion of its fuel, an automatic temperature-regulator consisting of helical or annular strips of differentially-expansible metals, secured together substantially as described, and surrounding a pipe conveying a fluid whose temperature is variable, the most expansible metal adjoining and subjected to the fluctuations in temperature of said pipe forming part of said apparatus, substantially as and for the purposes set forth.

2. In a heat-generating apparatus, a temperature-regulator consisting of the following-named elements in combination: a heat-transmitting pipe or core, coils of metals of differential expansibility surrounding said core and secured to an adjustable lever, as 6, and to a vibratory lever, as 10, connected to a fuel damper or dampers, the whole arranged and operating substantially as described, for the purposes set forth.

JOHN T. HAWKINS.

Witnesses:
FRANCIS P. REILLY,
JAMES J. McGRATH.